United States Patent [19]
Tomita et al.

[11] Patent Number: 6,028,954
[45] Date of Patent: *Feb. 22, 2000

[54] METHOD AND APPARATUS FOR THREE-DIMENSIONAL POSITION MEASUREMENT

[75] Inventors: Fumiaki Tomita; Hironobu Takahashi, both of Tsukuba, Japan

[73] Assignees: Industrial Science & Technology, Kozo Iizuka, Director-General of Agency, Tokyo; Sanyo Electric Co., Ltd., Osaka-fu, both of Japan

[ * ] Notice: This patent is subject to a terminal disclaimer.

[21] Appl. No.: 08/196,866

[22] Filed: Feb. 14, 1994

Related U.S. Application Data

[63] Continuation-in-part of application No. 08/135,274, Oct. 12, 1993, abandoned, which is a continuation of application No. 08/038,559, Mar. 26, 1993, abandoned, which is a continuation of application No. 07/814,195, Dec. 20, 1991, abandoned, which is a continuation of application No. 07/405,931, Sep. 12, 1989, abandoned.

[30] Foreign Application Priority Data

Nov. 18, 1988 [JP] Japan .................................. 63-293038
Nov. 18, 1988 [JP] Japan .................................. 63-293039

[51] Int. Cl.[7] ..................................................... G06K 9/32
[52] U.S. Cl. .............................................. 382/154; 395/94
[58] Field of Search ................................ 382/45, 46, 154, 382/153, 291, 285; 395/93.94

[56] References Cited

PUBLICATIONS

Foley et al, "Computer Graphics . . . ," 1991, pp 213–222., Addison–Wesley Pub. Co.

*Primary Examiner*—Joseph Mancuso
*Assistant Examiner*—Gerard Del Rosso
*Attorney, Agent, or Firm*—Darby & Darby

[57] ABSTRACT

An image processing method and an apparatus therefor calculating the rotations and the magnifications of a plurality of image pick-up devices, which are located at different positions and rotations and rotates, and pick-up images of the same object in a three-dimensional space, from the following equation by matching the image picked-up by the two arbitrary image pick-up devices, extracting the corresponding points, and detecting the coordinates values thereof on each image, $$\frac{\left\{R_x(-\theta_L)R_y(-\phi_L)R_z(-\alpha_L)\begin{pmatrix}X'_L\\Y'_L\\1\end{pmatrix}\right\}_y}{\left\{R_x(-\theta_L)R_y(-\phi_L)R_z(-\alpha_L)\begin{pmatrix}X-L'\\Y'_L\\1\end{pmatrix}\right\}_z} = \frac{\left\{R_x(-\theta_R)R_y(-\phi_R)R_z(-\alpha_R)\begin{pmatrix}X'_R\\Y'_R\\1\end{pmatrix}\right\}_y}{\left\{R_x(-\theta_R)R_y(-\phi_R)R_z(-\alpha_R)\begin{pmatrix}X-R'\\Y'_L\\1\end{pmatrix}\right\}_z}$$

where,
{expression}$_y$: y component of the expression,
{expression}$_z$: z component of the expression,
x,y,z: coordinate values of a point in a three-dimensional space,
$X_L'$, $Y_L'$, $X_R'$, $Y_R'$: coordinate values of x, y on both images,
$\theta_L$, $\phi_L$, $\alpha_L$, $\phi_R$, $\alpha_R$: differences in the rotation from the x-, y-, and z-axes of both image pick-up devices from the state to become a reference,
$f_L$, $f_R$: magnifications of both image pick-up devices.

5 Claims, 9 Drawing Sheets

METHOD AND APPARATUS FOR THREE-DIMENSIONAL POSITION MEASUREMENT

This patent application is a continuation-in-part of patent application Ser. No. 8/135,274 filed Oct. 12, 1993, now abandoned, which was a continuation of Ser. No. 8/038,559 filed Mar. 26, 1993 now abandoned, which was continuation of Ser. No. 7/814,195 filed Dec. 20, 1991, now abandoned, which was a continuation of application Ser. No. 7/405,931 filed Sep. 12, 1989 now abandoned.

FIELD OF THE INVENTION

The present invention relates to a method and apparatus for measuring the position of objects in three-dimensional space by processing digitized image information and, to be further detailed, relates to a method for self-calibrating stereo cameras wherein the rotations of the camera's image pick-up devices in a three dimensional space and the magnifications of images which are picked-up by image pick-up devices rotated arbitrarily at different positions are detected by processing the images of the same object in the three-dimensional space.

BACKGROUND OF THE INVENTION

It is known in the field of robotics that the position of an object in three-dimensional space can be determined from the multiple images produced by a stereo camera system. Such a system typically includes a plurality of image pick-up devices (e.g. video cameras), each of which may be rotated relative to three coordinates axes (the X, Y, and Z axes) by means of appropriate motors and drive control circuits. In addition, each image pick-up device is provided with a zoom lens operated by a motor and drive control circuit, to achieve controllable, variable magnification. In operation, plural image pick-up devices are positioned in a known relative orientation, and the position of an object in three-dimensional space is determined from the images of that object provided by the different image pick-up devices, using a method of triangulation.

To measure the positions of objects in a three-dimensional space from picked-up images of the objects, the correct positions and the configurations of the image pick-up devices are required.

A conventional approach uses points in an image, for which the positions in three-dimensional space are known.

For example, refer to the paper "Camera Calibration for 3D Computer Vision Proc. Int. Workshop on Industrial Applications of Machine Vision and Machine Intelligence" by O. D. Faugeras, G. Toscani, et al.

According to this paper, point marks on a flat plate for which the three-dimensional positions are known are installed in front of the image pick-up device, and the position and the rotational orientation of the image pick-up device are measured, based on the position on the picked-up images of the point marks.

Here, to simplify description, it is assumed that only the rotation and the magnification of the image pick-up devices are unknown, and other parameters such as the position are all known.

Coordinates of a point p in a three-dimensional space are taken as (x,y,z), and a projected point of the point p on an image is represented by P(X,Y). Here, for the sake of simplification, the image pick-up device is assumed to be positioned at an origin (0,0,0) in three-dimensional space. Also, the focal length of the image pick-up devices is taken as f, and the rotations around the x-axis, y-axis and z-axis are taken as $\theta, \phi$ and $\alpha$, respectively. At this time, taking the point transformed by magnification and rotation in three-dimensional space as p'(x',y',z'), the relationship among the values of the coordinates of the point p and the point P are expressed by the following Equations (1) and (2).

$$\begin{pmatrix} x' \\ y' \\ z' \end{pmatrix} = E(f) R_x(\theta) R_y(\phi) R_z(\alpha) \begin{pmatrix} x \\ y \\ z \end{pmatrix} \quad (1)$$

$$\begin{pmatrix} X \\ Y \end{pmatrix} = \frac{1}{z} \begin{pmatrix} x' \\ y' \end{pmatrix} \quad (2)$$

Here, Rx, Ry, and Rz are matrices representing rotation, being given by the following Equations (3), respectively.

$$R_x(\theta) = \begin{pmatrix} 1 & 0 & 0 \\ 0 & \cos\theta & -\sin\theta \\ 0 & \sin\theta & \cos\theta \end{pmatrix} \quad (3)$$

$$R_y(\phi) = \begin{pmatrix} \cos\phi & 0 & \sin\phi \\ 0 & 1 & 0 \\ -\sin\phi & 0 & \cos\phi \end{pmatrix}$$

$$R_z(\alpha) = \begin{pmatrix} \cos\alpha & -\sin\alpha & 0 \\ \sin\alpha & \cos\alpha & 0 \\ 0 & 0 & 1 \end{pmatrix}$$

Also, E designates a matrix representing the magnification of the image and is given by the following Equation (3').

$$E(f) = \begin{pmatrix} f & 0 & 0 \\ 0 & f & 0 \\ 0 & 0 & 1 \end{pmatrix} \quad (3')$$

Next, the positions of n (three or more) points are determined in the three dimensional space. The positions of these n points in the three-dimensional space are represented by $p_1(x_1, y_1, z_1), p_2(x_2, y_2, z_2) \ldots p_n(x_n, y_n, z_n)$, and the coordinates of those points on a picked-up image are represented by $P_1(X_1, Y_1), P_2(X_2, Y_2) \ldots P_n(X_n, Y_n)$, respectively.

Here, taking points transformed by rotation in Equations (1) and (2) as $P_1'(X_1', Y_1'), P_2'(X_2', Y_2') \ldots P_n'(X_n', Y_n')$ respectively, the following Equation (4) holds.

$$\begin{pmatrix} X_i' \\ Y_i' \end{pmatrix} = F(\theta, \phi, \alpha, f) \begin{pmatrix} x_i \\ y_i \\ z_i \end{pmatrix} \quad (4)$$

where, $1 \leq i \leq n$

When each of the rotation angles $\theta, \phi$ and $\alpha$ is evaluated correctly, the following Equations (4') hold for all of i.

$$X_i = X_i'$$

$$Y_i = Y_i' \quad (4')$$

However, perfect matching is not obtained due to errors in measurement, and therefore the rotation $\theta, \phi$ and $\alpha$ are evaluated by the least squares method in such a manner that the value of the following Equation (5) is minimized.

$$\sum_{i=1}^{n}\{(X'_i - X_i)^2 + (Y'_i - Y_i)^2\} \quad (5)$$

In such a conventional approach, a real known object must be installed at a known position in the three-dimensional space. However, for an apparatus which moves during operation or an apparatus which often changes an object to be observed, the image pick-up device is required to be moved frequently. Then, the conventional approach necessitates that image pick-up be performed by installing the known object at the known position every time the image pick-up device is moved.

However, it is troublesome and difficult in practice to install the known object at the known point every time the device is moved. It is particularly difficult to use it for a mobil robot, which is a high-speed mobile apparatus in an unmanned environment or in the open air.

The present invention has been achieved in the light of such circumstances, and proposes to provide an image processing method and an apparatus therefor which do not necessitate installing a known object at a known position, and which can detect the rotations and the focal lengths (magnifications) of image pick-up devices by picking-up an object using only a plurality of image pick-up devices, even if the position and configuration of the object are not known at all.

Therefore, the method and the apparatus in accordance with the present invention pick-up images of an object whose position and configuration are unknown, by means of a plurality of image pick-up devices located at different positions, determine the values of coordinates of the object in each image, and estimate the rotations and the focal lengths (i.e. the magnifications of the images of the image pick-up devices). Thereby, basically, the rotations and the focal lengths (magnifications) of the image pick-up devices themselves can be detected by using only the images picked-up by a plurality of image pick-up devices and, therefore, unlike the conventional approach, no calibration is required using an object whose position or configuration in a three-dimensional space is fixed.

The above and further objects and features of the invention will more fully be apparent from the following detailed description with accompanying drawings.

DESCRIPTION OF THE PREFERRED EMBODIMENTS

Hereinafter, description is made first of a method in accordance with the present invention, that is, a method of detecting the rotation of each image pick-up device using images picked-up by a plurality of image pick-up devices.

Straightforwardly, the method of the present invention uses the fact that when image picking-up is performed by a plurality of image pick-up devices having the same focal length and installed in parallel, the values of coordinates in images of the same point picked-up in a three-dimensional space match on an axis perpendicular to the axis connecting the image pick-up devices.

The present invention can be applied to a system using three or more image pick-up devices, but here, for convenience, description is made of the case of using two image pick-up devices disposed right and left.

Figure 1:
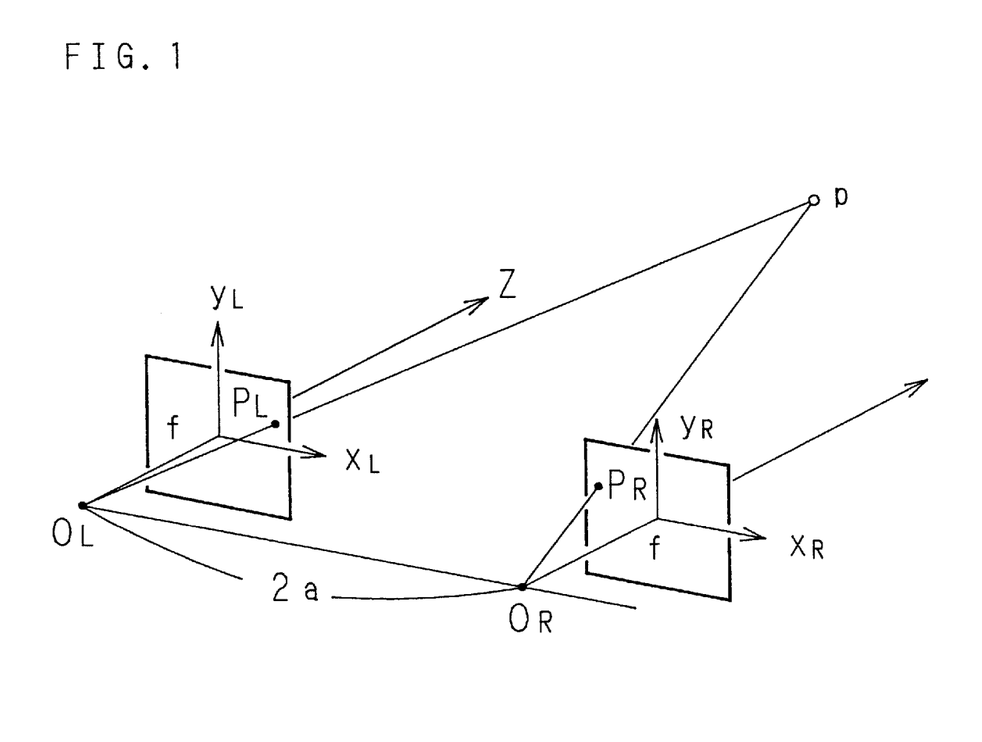
FIG. 1 is a schematic diagram useful in explaining the principle of the method of the present invention.

First, as shown in FIG. 1, the reference state of the image pick-up devices is determined. The coordinate axis connecting the two image pick-up devices is taken as the X-axis, and the optical axes of the two image pick-up devices are assumed to be parallel to each other and perpendicular to the X-axis. The direction of this optical axis is taken as the Z-axis. Furthermore, the direction perpendicular to both the Z-axis and the X-axis is taken as the Y-axis. Also, the distance between the two image pick-up devices is taken as $2a$.

In this reference state, the values of coordinates $P_L(X_L, Y_L)$ and $P_R(X_R, Y_R)$ on each of the right and left images obtained by picking-up a point $p(x,y,z)$ in a three-dimensional space (the origin is set at the midpoint between $O_L$ and $O_R$) are given by the following Equations (6), with the focal length taken as 1.

$$\begin{pmatrix} X_L \\ Y_L \end{pmatrix} = \frac{1}{z}\begin{pmatrix} x+a \\ y \end{pmatrix} \quad (6)$$

$$\begin{pmatrix} X_R \\ Y_R \end{pmatrix} = \frac{1}{z}\begin{pmatrix} x-a \\ y \end{pmatrix}$$

Since $a>0$, from these Equations (6), the following Equations (7) are obtained.

$$X_L > X_R$$

$$Y_L = Y_R \quad (7)$$

Next, the values of coordinates on images picked-up by the real image pick-up devices are taken as $P_L'(X_L', Y_L')$ and $P_R'(X_R', Y_R')$, respectively. Also, the rotations of the left and right image pick-up devices relative to the reference state are taken as $(\theta_L, \phi_L$ and $\alpha_L)$ and $(\theta_R, \phi_R$ and $\alpha_R)$, respectively, around the x-axis, y-axis and the z-axis. Furthermore, the respective focal lengths are taken as $f_L$ and $f_R$. Like the Equation (1), the following Equation (8) is obtained, $$\begin{pmatrix} x'_L \\ y'_L \\ z'_L \end{pmatrix} = E(f_L)R_z(\alpha_L)R_y(\phi_L)R_x(\theta_L)\begin{pmatrix} x+a \\ y \\ z \end{pmatrix} \quad (8)$$

and the following Equation (8') is obtained for the image pick-up device at the left side.

$$\begin{pmatrix} X'_L \\ Y'_L \end{pmatrix} = \frac{1}{z'_L}\begin{pmatrix} x'_L \\ y'_L \end{pmatrix} \quad (8')$$

From the above Equations (8) and (8'), the following Equation (9) is obtained.

$$\begin{pmatrix} x+a \\ y \\ z \end{pmatrix} = E\left(\frac{1}{f_L}\right)R_x(-\theta_L)R_y(-\phi_L)R_z(-\alpha_L)\begin{pmatrix} x'_L \\ y'_L \\ z'_L \end{pmatrix} \quad (9)$$

The following Equation (10) is obtained by dividing the both members of Equation (9) by $z'_L$.

$$\frac{1}{z'_L}\begin{pmatrix} x+a \\ y \\ z \end{pmatrix} = E\left(\frac{1}{f_L}\right)R_x(-\theta_L)R_y(-\phi_L)R_z(-\alpha_L)\begin{pmatrix} x'_L/z'_L \\ y'_L/z'_L \\ 1 \end{pmatrix} \quad (10)$$

$$= E\left(\frac{1}{f_L}\right)R_x(-\theta_L)R_y(-\phi_L)R_z(-\alpha_L)\begin{pmatrix} X'_L \\ Y'_L \\ 1 \end{pmatrix}$$

Accordingly, y/z can be expressed by a function for $P'_L(X'_L, Y'_L)$, that is, the following Equation (11). where, $$\frac{y}{z} = \frac{y/z'_L}{z/z'_L} = \frac{\left\{E\left(\frac{1}{f_L}\right)R_x(-\theta_L)R_y(-\phi_L)R_z(-\alpha_L)\begin{pmatrix} X'_L \\ Y'_L \\ 1 \end{pmatrix}\right\}_y}{\left\{E\left(\frac{1}{f_L}\right)R_x(-\theta_L)R_y(-\phi_L)R_z(-\alpha_L)\begin{pmatrix} X'_L \\ Y'_L \\ 1 \end{pmatrix}\right\}_z} = \quad (11)$$

$$\frac{1}{f_L}\frac{\left\{R_x(-\theta_L)R_y(-\phi_L)R_z(-\alpha_L)\begin{pmatrix} X'_L \\ Y'_L \\ 1 \end{pmatrix}\right\}_y}{\left\{R_x(-\theta_L)R_y(-\phi_L)R_z(-\alpha_L)\begin{pmatrix} X'_L \\ Y'_L \\ 1 \end{pmatrix}\right\}_z}$$

{expression}$_y$ represents a y component of the expression, and,

{expression}$_z$ represents a z component of the expression.
For the image pick-up device at the right side, the following Equation (11') is likewise obtained.

$$\frac{y}{z} = \frac{y/z'_R}{z/z'_R} = \frac{\left\{E\left(\frac{1}{f_L}\right)R_x(-\theta_L)R_y(-\phi_L)R_z(-\alpha_L)\begin{pmatrix} X'_R \\ Y'_R \\ 1 \end{pmatrix}\right\}_y}{\left\{E\left(\frac{1}{f_L}\right)R_x(-\theta_L)R_y(-\phi_L)R_z(-\alpha_L)\begin{pmatrix} X'_R \\ Y'_R \\ 1 \end{pmatrix}\right\}_z} = \quad (11')$$

$$\frac{1}{f_L}\frac{\left\{R_x(-\theta_L)R_y(-\phi_L)R_z(-\alpha_L)\begin{pmatrix} X'_R \\ Y'_R \\ 1 \end{pmatrix}\right\}_y}{\left\{R_x(-\theta_L)R_y(-\phi_L)R_z(-\alpha_L)\begin{pmatrix} X'_R \\ Y'_R \\ 1 \end{pmatrix}\right\}_z}$$

Here, from Equation (7), $$Y_L = Y_R = \frac{y}{z}.$$

Therefore, the following Equation (12) holds.

$$\frac{1}{f_L}\frac{\left\{R_x(-\theta_L)R_y(-\phi_L)R_z(-\alpha_L)\begin{pmatrix} X'_L \\ Y'_L \\ 1 \end{pmatrix}\right\}_y}{\left\{R_x(-\theta_L)R_y(-\phi_L)R_z(-\alpha_L)\begin{pmatrix} X'_L \\ Y'_L \\ 1 \end{pmatrix}\right\}_z} = \quad (12)$$

$$\frac{1}{f_R}\frac{\left\{R_x(-\theta_R)R_y(-\phi_R)R_z(-\alpha_R)\begin{pmatrix} X'_R \\ Y'_R \\ 1 \end{pmatrix}\right\}_y}{\left\{R_x(-\theta_R)R_y(-\phi_R)R_z(-\alpha_R)\begin{pmatrix} X'_R \\ Y'_R \\ 1 \end{pmatrix}\right\}_z}$$

Resultingly, the rotations from the reference state of the image pick-up devices can be evaluated by determining $\alpha_L$, $\phi_L$, $\theta_L$, $\alpha_R$, $\phi_R$, $\theta_R$, $f_L$ and $f_R$ so that this Equation satisfies a plurality of corresponding points (representing the same point in the three-dimensional space) between the left and right images. Note that $\theta_L$ and $\theta_R$ are rotations around the axis connecting both image pick-up devices, and are not independent of each other, so that either one of them or only the difference between them can be evaluated. As is obvious from the Equation, the focal lengths $f_L$ and $f_R$ are also not independent of each other, so that their ratio can be evaluated.

In the actual image processing, to eliminate errors, an optimum value is evaluated using the least squares method.

Then, by neglecting the terms relating to the focal lengths $f_L$ and $f_R$ in the above Equations (6), (8), (9), (10), (11) and (11'), the following Equation (12') holds.

$$\frac{\left\{R_x(-\theta_L)R_y(-\phi_L)R_z(-\alpha_L)\begin{pmatrix}X'_L\\Y'_L\\1\end{pmatrix}\right\}_y}{\left\{R_x(-\theta_L)R_y(-\phi_L)R_z(-\alpha_L)\begin{pmatrix}X'_L\\Y'_L\\1\end{pmatrix}\right\}_z} = \quad (12')$$

$$\frac{\left\{R_x(-\theta_R)R_y(-\phi_R)R_z(-\alpha_R)\begin{pmatrix}X'_R\\Y'_R\\1\end{pmatrix}\right\}_y}{\left\{R_x(-\theta_R)R_y(-\phi_R)R_z(-\alpha_R)\begin{pmatrix}X'_R\\Y'\\1\end{pmatrix}\right\}_z}$$

Resultingly, the rotation from the reference state of the image pick-up devices can be evaluated by determining $\alpha_L$, $\phi_L$, $\theta_L$, $\alpha_R$, $\phi_R$, and $\theta_R$ so that this Equation satisfies a plurality of corresponding points (representing the same point in the three-dimensional space) between the left and right images. Note that $\theta_L$ and $\theta_R$ are rotations around the axis connecting both image pick-up devices, and are not independent of each other, so that either one of them or only the difference between them can be evaluated. In actual image processing, to eliminate errors, an optimum value is evaluated using the least squares method like the case of Equation (12).

In addition, the above description is made in the case of using two image pick-up devices, but the above-mentioned Equations (12) and (12') can be extended to the case of using three or more image pick-up devices, and it is obvious that the present invention is applicable also to a plurality of image pick-up devices.

Hereafter, detailed description is made of an embodiment of the present invention in reference to drawings.

Figure 2:
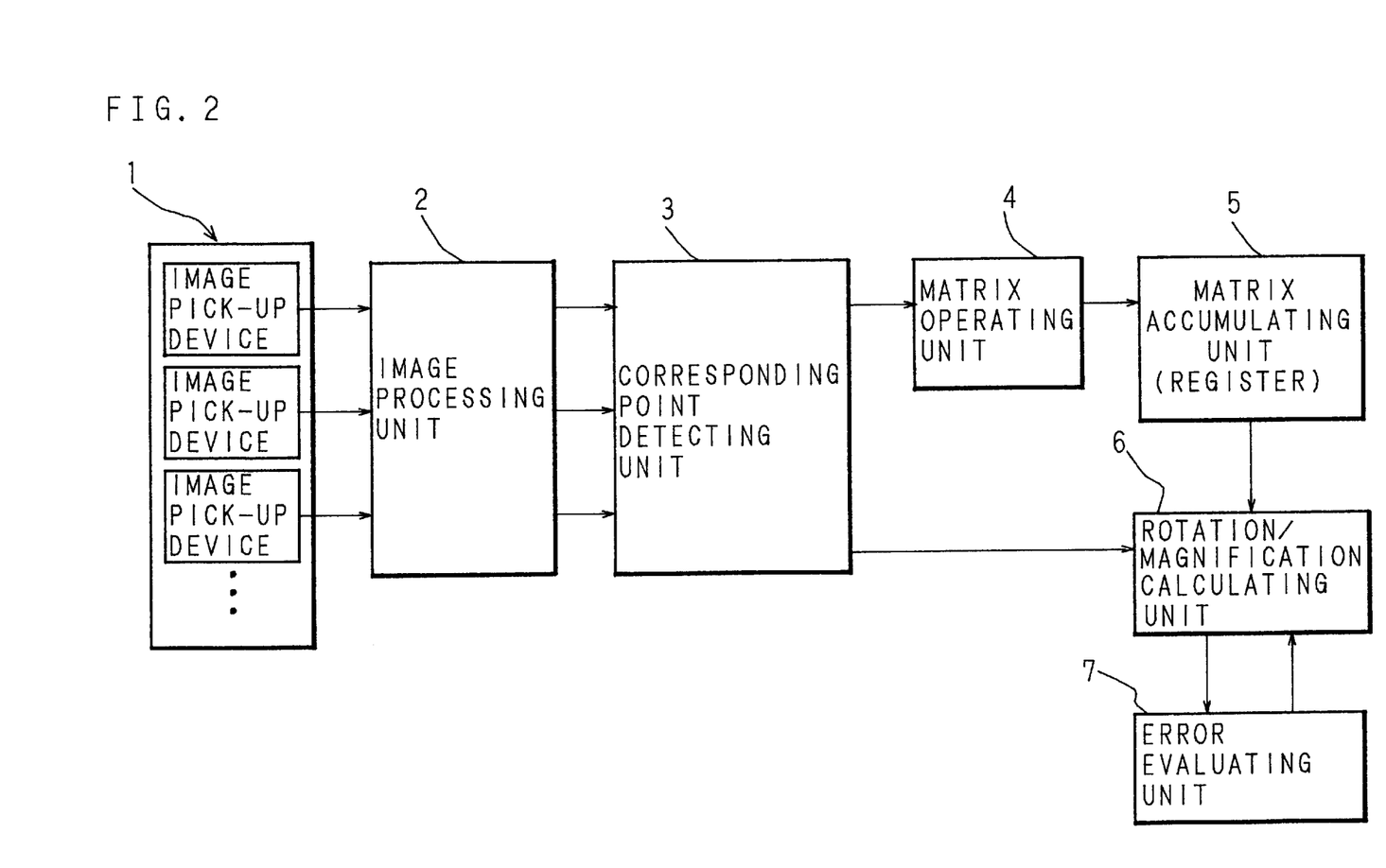
FIG. 2 is a block diagram showing a preferred configuration of an image processing apparatus in accordance with the present invention.

FIG. 2 is a block diagram showing a configuration of an image processing apparatus used for executing the method of the present invention based on the principle as described above.

In addition, the following description is made of the case of using two image pick-up devices, but the apparatus of the present invention is applicable to the case of using more image pick-up devices as shown in FIG. 2.

In FIG. 2, numeral 1 designates a stereo camera system or other image pick-up unit constituted with a plurality of image pick-up devices, which are located at known positions in a three-dimensional space to pick up images of objects.

The reference numeral 11 designates a conventional camera controller, which incorporates motors and control units to rotate each image pick up device with respect to three coordinate axes and to control its zoom or magnification.

The images produced by image pick up unit 1 are applied to image distortion unit 12, described in detail below. The distortion unit performs a transformation on the pick-up images which are equivalent to those achieved by camera rotation and change of image magnification (i.e. camera zooming). As will be explained more fully below, unit 12 receives information corresponding to the rotation and magnifications of the image pick up devices and utilizes this information to distort the images so as to reverse or compensate for the effects of the rotation or magnification of an image pick up device being different from a reference value.

The distorted images from unit 12 are sent to an image processing unit 2. The image processing unit 2 processes the given images, extracts feature points and sends them to a corresponding point detecting unit 3.

The corresponding point detecting unit 3 compares the feature points of the images picked-up by a plurality of image pick-up devices, in order to select the corresponding points by means of similarity of features, and sends the coordinate values in each image to a matrix operating unit 4.

Then, the Equation (12) cannot be solved analytically, and therefore in the matrix operating unit 4, the solution is obtained by the method of iteration using a linear approximate expression. A linear approximate expression of the "left member—the right member" of Equation (12) is expressed by the following Equation (13).

The left member—the right member $$\text{The left member} - \text{the right member} = \quad (13)$$
$$\frac{1}{f_L}\frac{\alpha_L X'_L + Y'_L - \theta_L}{-\phi'_L X_L + \theta'_L Y_L + 1} - \frac{1}{f_R}\frac{\alpha_R X'_R + Y'_R - \theta_R}{-\phi_R X'_R + \theta_R Y'_R + 1}$$

An error e is determined as shown by the following Equation (13') from this Equation (13).

$$e = \frac{f_R}{f_L}(\alpha_L X'_L + Y'_L - \theta_L)(-\phi_R X'_R + \theta_R Y'_R + 1) - \quad (13')$$
$$(\alpha_R X'_R + Y'_R - \theta_R)(-\phi'_L X_L + \theta'_L Y_L + 1)$$
$$= F(\alpha_L X'_L + Y'_L - \theta_L)(-\phi_R X'_R + \theta_R Y'_R + 1) -$$
$$(\alpha_R X'_R + Y'_R - \theta_R)(-\phi'_L X_L + \theta'_L Y_L + 1)$$

Furthermore, by the reason, described in the item of the principle of the present invention, in this embodiment, $\theta_R$ is set to 0 for convenience sake. Furthermore, by eliminating higher-order terms, the following Equation (14) is obtained.

$$e'=-(Y'_L-Y'_R+1)\theta_L+X'_L Y'_R\phi_L+X'_L\alpha_L-X_R Y'_L\phi_R-X'_R\alpha_R+(Y'_L-Y'_R)+Y'_L d \quad (14)$$

where, $d = F - 1$

The matrix operating unit 4 calculates the terms of Equation (14) with respect to each point, and sends the calculation results to a matrix accumulating unit 5. The matrix accumulating unit 5, which performs a least squares method approximation, comprising 42 registers representing the values of a 6×7 matrix, and products of each term of $\theta_L$, $\phi L$, $\alpha_L$, $\phi_R$, $\alpha_R$, d and each term of $\theta_L$, $\phi L$, $\alpha_L$, $\phi_R$, $\alpha_R$, d, 1 (that is, $(Y_L-Y_R)$ in Equation (14)) are evaluated, being added to each register.

In addition, as described above, where only the rotations of the image pick-up devices are evaluated by neglecting the focal lengths $f_L$ and $f_R$, the matrix accumulating unit 5 need only comprise 30 registers representing values of a 5×6 matrix.

When addition is completed for all of the corresponding points, these values are sent to a rotation/magnification calculating unit 6, and a linear equation is solved by the matrix operation. Resultingly, the rotations (angles) $\theta_L$, $\phi_L$, $\alpha_L$, $\phi_R$, and $\alpha_R$ and the ratio of magnifications d of the image pick-up devices are obtained. However, each of these values is obtained as a solution of a linear approximate expression, and therefore contains an error. Then, the obtained solution is sent to an error evaluating unit 7. The error evaluating unit 7 calculates the precision of the solution. When the error is less than a constant value, the error evaluating unit 7 indicates that a solution has been obtained.

When the error is more than the constant value, the solution representing the rotation is sent to the choosing unit 15. The calculated angular rotations are provided from the choosing unit 15 to the camera controller 11 and to the image distorting unit 12, depending upon the values of θ, φ and α. When the values of these angles are small (e.g. less than 10), they are applied to the image distorting unit 12. Otherwise, they are applied to the camera controller 11. When the angles are applied to the camera controller 11, the controller causes the respective pick-up devices to rotated to their calculated values for −θ, −φ, and −α, thereby producing a correction for the calculated angles of rotation. Similarly, when the angles are applied to the image distorting unit, image processing is performed which produces the equivalent result of rotating the respective pick-up devices to −θ, −φ, and −α. As a result, the apparent rotation of the image becomes extremely small. This processing is iterated for both left and right images until the rotations obtained as solutions become less than the constant value, and correct values are finally obtained.

When the error valuating unit 7 indicates that a solution has been obtained, 3-dimensional position calculating unit 13 utilizes the output of corresponding point detecting unit 3 to perform a conventional triangulation process, which determines the location of the object in 3-dimensional space. The output of unit 13 is provided to 3-dimensional displaying and printing unit 14 which displays and/or prints an image of the object.

A description will now be provided of the detailed operation of image distorting unit 12. As explained above, this unit performs the same transformation of images as would be achieved by rotation of the pick-up devices and change of their image magnification.

Initially, a given original image is stored in memory. The direction of the light which produces the pixel stored in memory is known in advance and is provided in the form of a correction value which is a characteristic property of the pick-up device (camera). For example, in the coordinate system illustrated in FIG. 1, if the image is projected on a pick-up surface lying in the plane of Z=1, the point P(X,Y,Z) in space can be transformed to coordinates such as:

$$X = -\frac{X}{Z} \quad (16)$$

$$Y = -\frac{Y}{Z}$$

In the case of rotating a camera, for example, first by θ degrees around the X axis, next by φ degrees around the Y axis and by α degrees around the Z axis, and taking the magnification of the obtained image as F, the rotation matrix A is calculated by the following equation:

$$A = F \begin{pmatrix} \cos\theta & \sin\theta & 0 \\ -\sin\theta & \cos\theta & 0 \\ 0 & 0 & 1 \end{pmatrix} \begin{pmatrix} \cos\phi & 0 & -\sin\phi \\ 0 & 1 & 0 \\ \sin\phi & 0 & \cos\phi \end{pmatrix} \begin{pmatrix} 1 & 0 & 0 \\ 0 & \cos\alpha & \sin\alpha \\ 0 & -\sin\alpha & \cos\alpha \end{pmatrix} \quad (17)$$

Since this matrix is a 3 by 3 matrix, it can be expressed by the terms $a_{11}$ through $a_{33}$, and the transformation of the image may be expressed by the following equation:

$$A = \begin{pmatrix} a_{11} & a_{12} & a_{13} \\ a_{21} & a_{22} & a_{23} \\ a_{31} & a_{32} & a_{33} \end{pmatrix} \quad (18)$$

Then, the point P(X,Y,Z) on the original image may be mapped into the point P'(X',Y') on the transformed image by the following equations:

$$X' = \frac{a_{11}X + a_{12}Y - a_{13}}{a_{31}X + a_{32}Y - a_{33}} \quad (19)$$

$$Y' = \frac{a_{21}X + a_{22}Y - a_{23}}{a_{31}X + a_{32}Y - a_{33}}$$

The position of all points on the original image are obtained by the transformation of equations 19, and the memory content is copied into corresponding points. As a result, the same effect is obtained as that obtained by rotation of the pick-up units.

Sometimes, after movement, a gap is generated. In such a case, an inverse matrix of the transformation matrix A is obtained, the position of the gap is inversely transformed, and it is copied with a memory value which represents a pixel at the nearest position on the original image. Specifically, defining the inverse matrix of A as B, B may be expressed as follows:

$$B = \begin{pmatrix} b_{11} & b_{12} & b_{13} \\ b_{21} & b_{22} & b_{23} \\ b_{31} & b_{32} & b_{33} \end{pmatrix} = A^{-1} \quad (20)$$

The positions of the provided gaps are represented by ($X_n$, $Y_n$). Then, the original positions of points may be obtained from the following equations:

$$X_0 = -\frac{b_{11}X_n + b_{12}Y_n - b_{13}}{b_{31}X_n + b_{32}Y_n - b_{33}} \quad (21)$$

$$Y_0 = -\frac{b_{21}X_n + b_{22}Y_n - b_{23}}{b_{31}X_n + b_{32}Y_n - b_{33}}$$

Accordingly, the memory content is copied with a memory value representing the pixel at the nearest position on the original image.

Verification of the ability of the apparatus of the present invention was performed as follows.

Figure 3A:
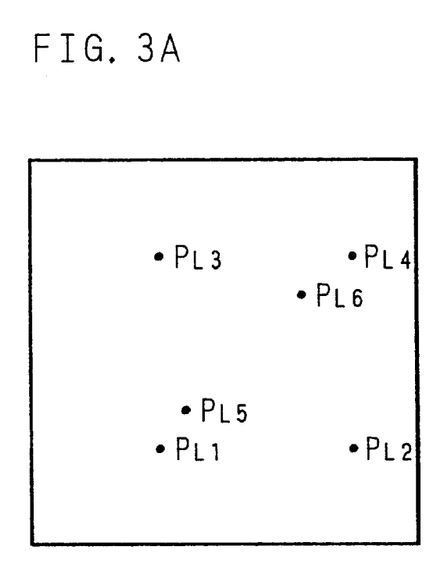
FIG. 3 is a schematic diagram showing images picked-up by the image pick-up devices in FIG. 2.
Figure 3B:
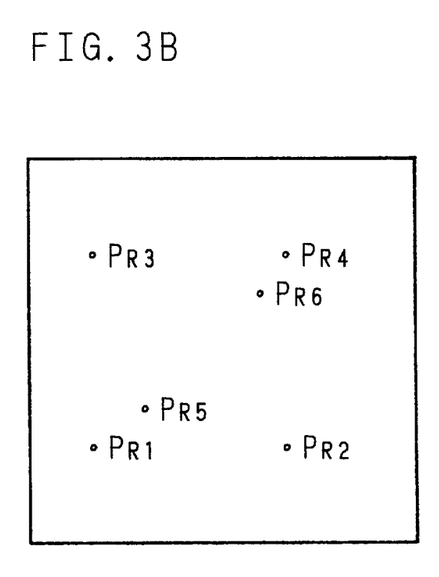

As shown in FIG. 3, six points ($P_L1,P_R1$), ($P_L2,P_R2$), ($P_L3,P_R3$), ($P_L4,P_R4$), ($P_L5,P_R5$) and ($P_L6,P_R6$) are obtained from the two image pick-up devices.

These points are coordinates on the image of the same points in a three-dimensional space. To verify the ability of this apparatus, random numbers are generated, and the angles and focal lengths of image pick-up devices were moved by values proportional to random numbers. The left image pick-up devices is installed at (−20.0, 0.0, 0.0) cm, the right device is installed at (20.0, 0.0, 0.0) cm respectively around the X, Y and Z axes in the three-dimensional space, and each point is disposed at each coordinate position of (−50, −50, 300), (50, −50, 300), (−50, 50, 300), (50, 50, 300), (−50, −50, 500) and (50, 50, 500) cm.

Figure 4:
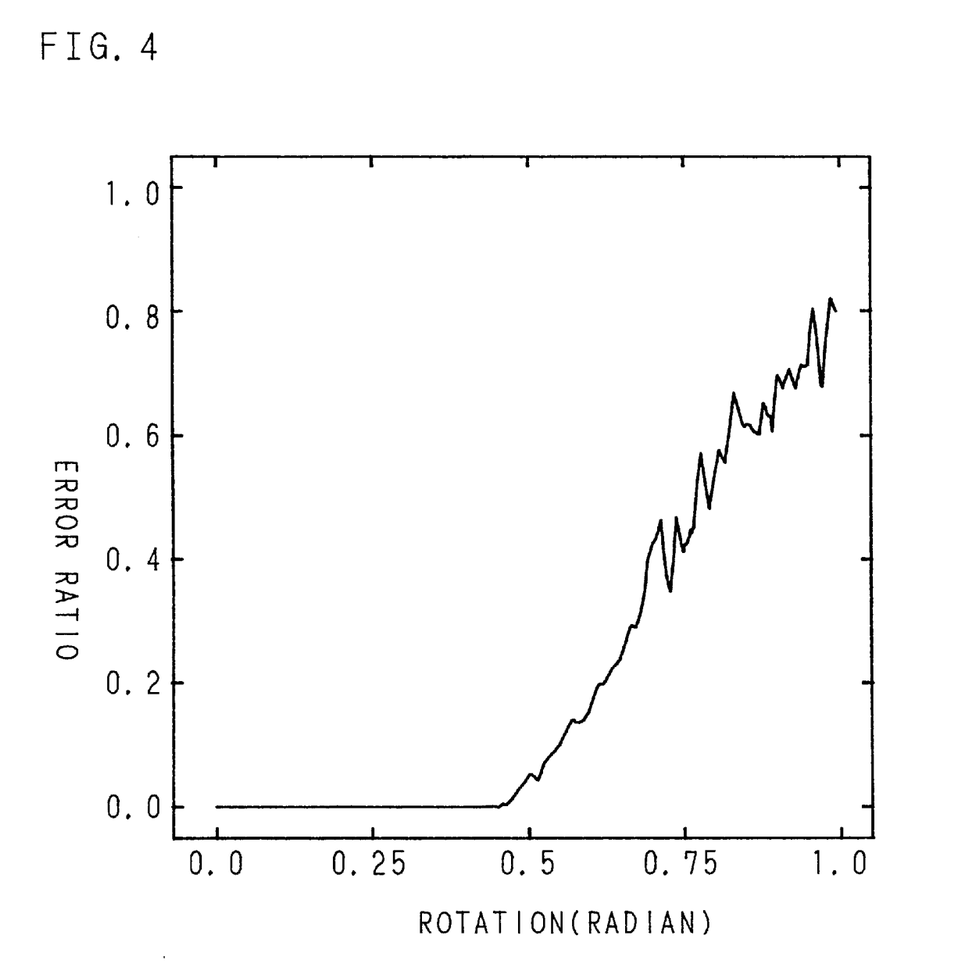
FIG. 4 is a graph showing the detecting results of the actual rotation and magnification by the apparatus of the present invention.

The coordinate values in the images of six points were inputted to this apparatus, and the rotations and the focal lengths of the image pick-up devices were detected. FIG. 4 shows the result thereof. Here, the angle of rotation and the focal length (with 1 centered) were varied within the range of values as shown on the abscissa. Furthermore, the trials were performed 1000 times for each focal length. The ordinate shows the number of times that no correct values were obtained for each 1000-times trial. As is obvious from FIG. 4, in the apparatus of the present invention, correct values were always obtained in the case of rotation within a range of ±0.35 radian. Also, the errors obtained were less than $10^{-6}$ radian.

Next, an example of application of the apparatus of the present invention to a scene of blocks is shown.

Figure 5A:
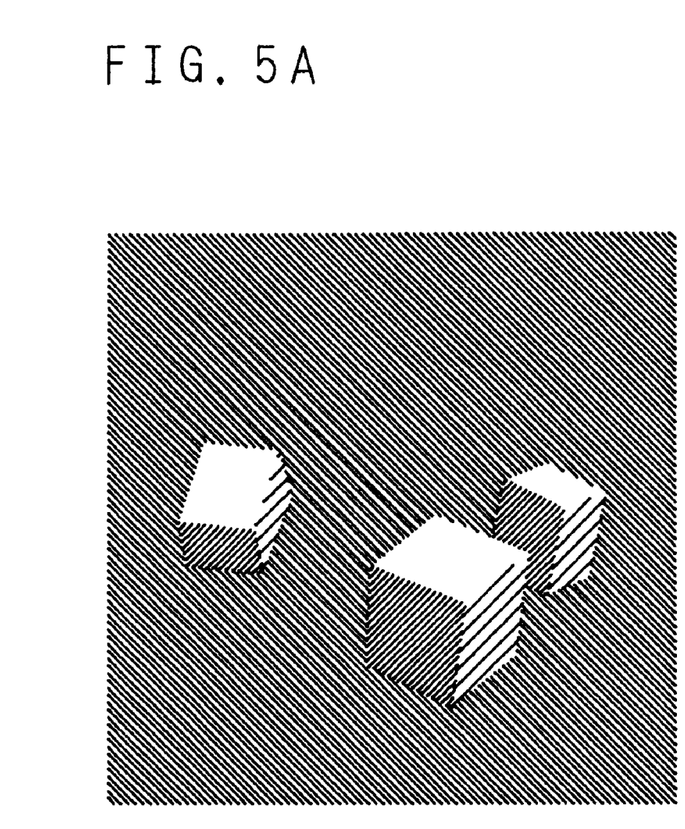
FIG. 5 is a schematic diagram showing one example of images picked-up by the apparatus of the present invention.
Figure 5B:
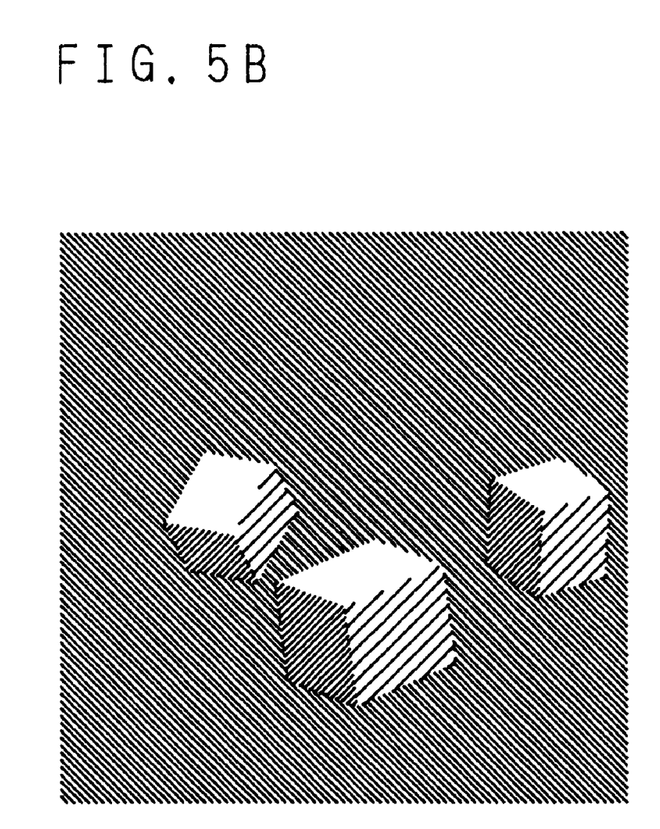

Images as shown in FIG. 5 are obtained by picking-up a scene of three blocks with two image pick-up devices.

In the conventional approach, when the rotation of the image pick-up device is not evaluated correctly, it is difficult to obtain a correct position and configuration of the blocks, as shown in FIG. 6.

Figure 6A:
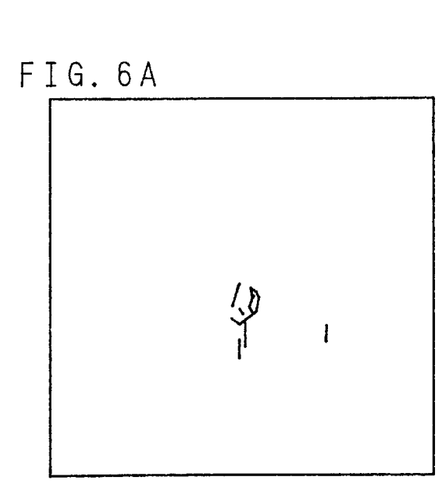
FIG. 6 is a schematic diagram showing the result of image processing by the conventional approach.
Figure 6B:
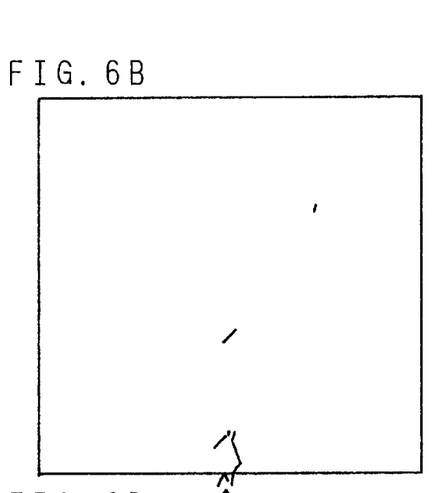
Figure 6C:
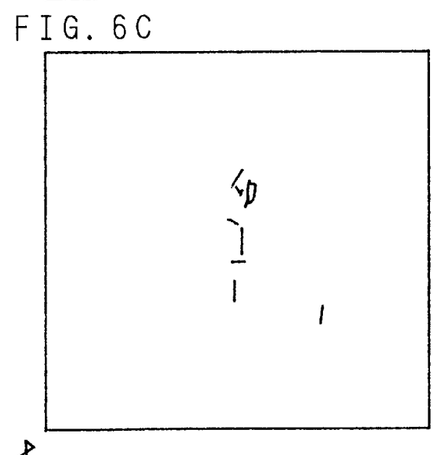
Figure 6D:
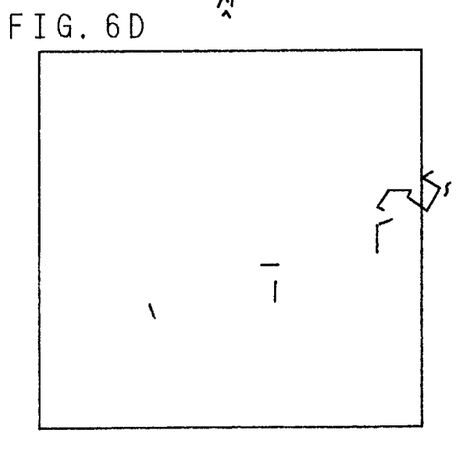

Where, FIG. 6(a) is an original view of the scene, FIG. 6(b) is a top view, FIG. 6(c) is a front view, and FIG. 6(d) is a side view.

Then, these images were inputted to the apparatus of the present invention, and the angles of rotations of the image pick-up devices were evaluated, and thereby the images were corrected.

Figure 7A:
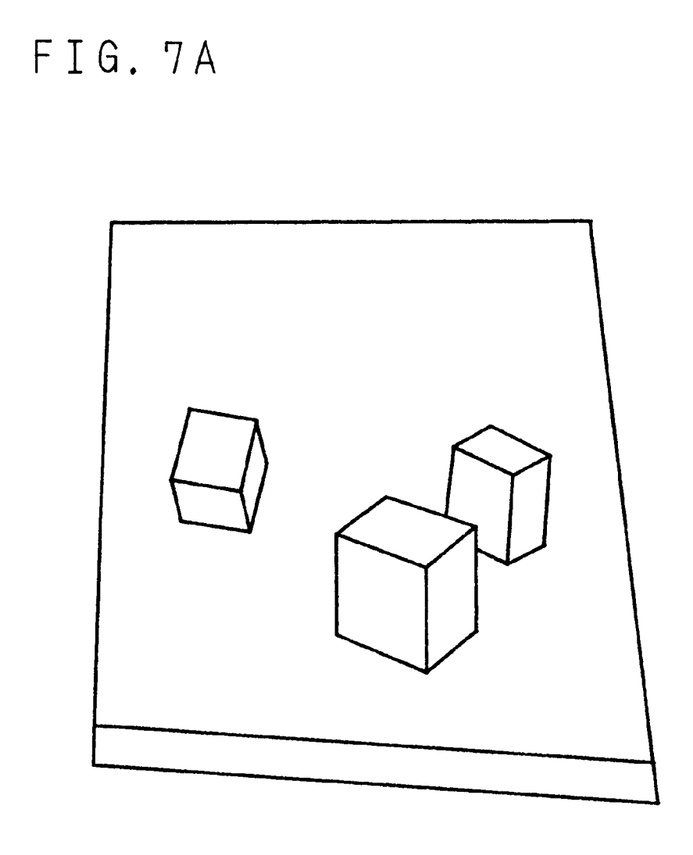
FIG. 7 is a schematic diagram showing the result of picking-up the state as shown in FIG. 5 by two image pick-up devices.
Figure 7B:
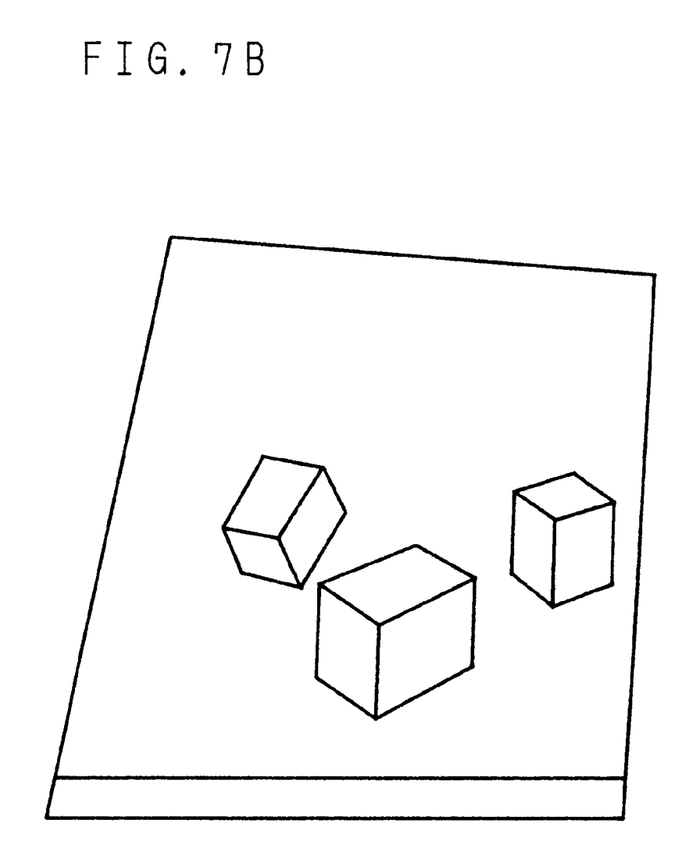

FIG. 7 shows the images outputted from the image processing unit 2. The corresponding point detecting unit 3 aims at connecting points of lines in the images, and extracts the corresponding points in the two images. Resultingly, relative shifts in the up-down direction (direction of Y-axis) are obtained between the corresponding points.

Figure 8A:
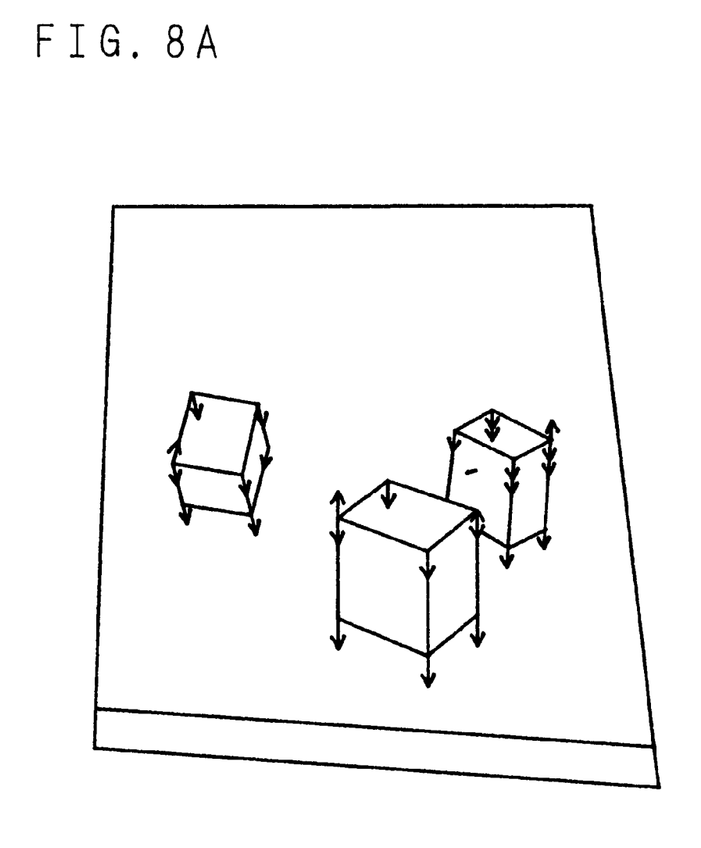
FIG. 8 is a schematic diagram showing the state of deviations of the two images as shown in FIG. 7 in the direction of Y-axis.
Figure 8B:
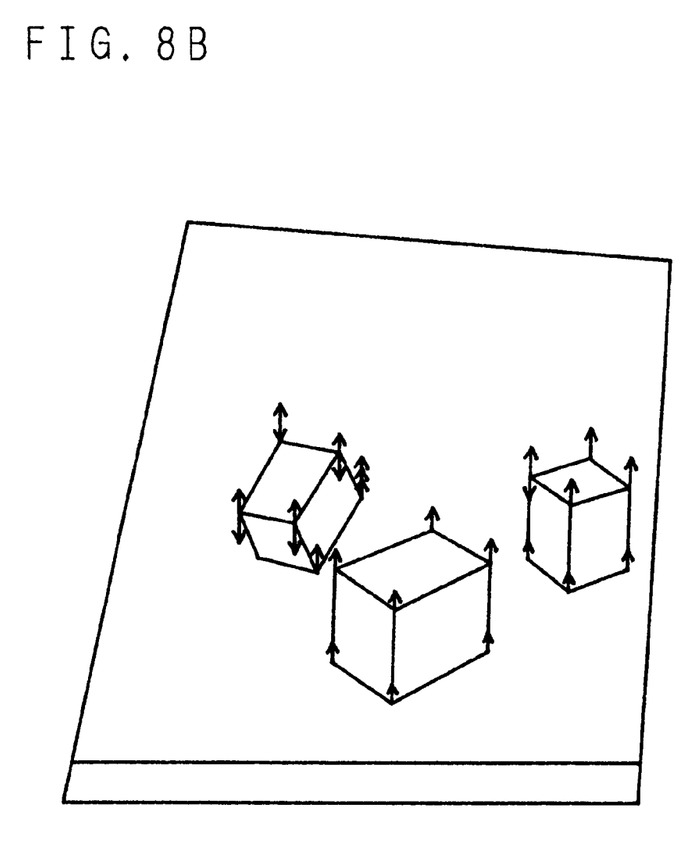

FIG. 8 is a schematic diagram showing this error.

This value is sent to the matrix operating unit 4, and the rotation is calculated by iterating the processing three to eight times. The image is transformed by this value, and the three-dimensional images obtained as a result of this correction are shown in FIG. 9.

Figure 9A:
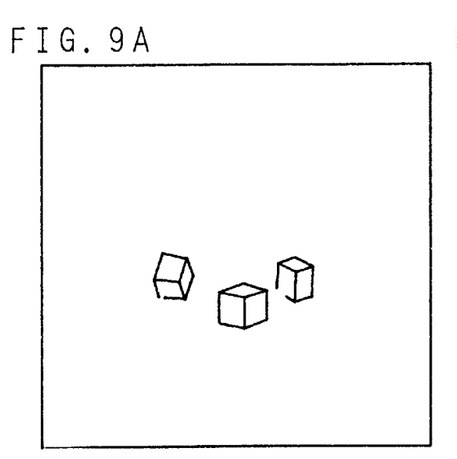
FIG. 9 is a schematic diagram showing the result of image processing by the apparatus of the present invention.
Figure 9B:
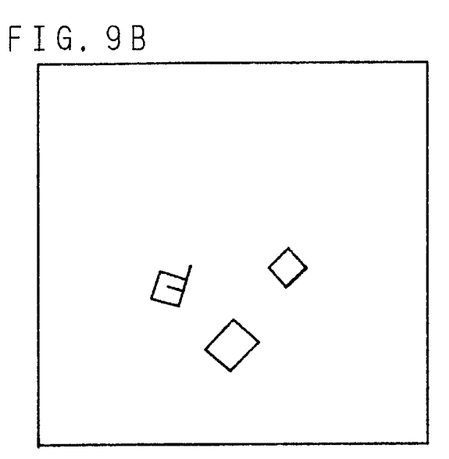
Figure 9C:
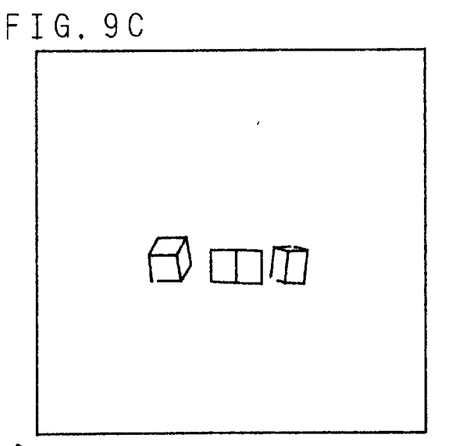
Figure 9D:
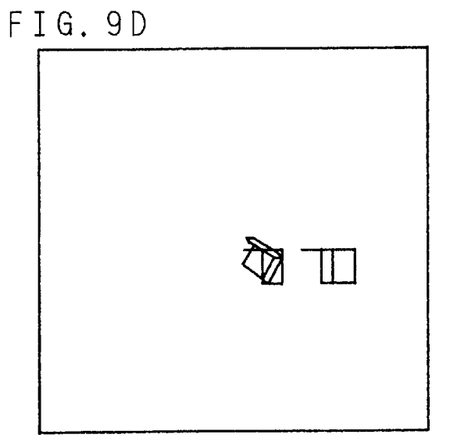

Where, FIG. 9(a) is an original view of the scene, FIG. 9(b) is a top view, FIG. 9(c) is a front view, and FIG. 9(d) is a side view, respectively.

As is obvious from FIG. 9, in accordance with the present invention, a remarkably accurate result can be obtained in comparison with the state before this correction.

As detailed above, in accordance with the present invention, the rotations and magnifications of the image pick-up devices can be detected from only the images which are picked-up by the image pick-up devices, and therefore troublesome processing, such as calibration performed by positioning the object at the predetermined position every time the apparatus is moved, can be dispensed with.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed:

1. A method for detecting the angular deviations from a reference position of a plurality of image pick-up devices located at different positions, which devices pick-up images of the same object in a three-dimensional space, comprising:

locating image points in two or said image pick-up devices which correspond to the same point on said object, the point locations being expressed as coordinates in a predefined coordinate system having x, y, and z axes, where (x,y,z) are the coordinates of the point on the object and $(X_L', Y_L')$ and $(X_R', Y_R')$ are the coordinates of said two image point; and determining the angular deviations, $(\theta_L, \phi_L, \alpha_L)$ and $(\theta_R, \phi_R, \alpha_R)$, of the two pick-up devices with respect to the x, y, and z axes from the reference position, said two image pick-up devices being positioned so that the optical axes thereof are parallel and have the same magnification, utilizing the following equation based on that, in said reference state, the coordinate values of corresponding points on the images obtained from said two image pick-up devices match on the axis perpendicular to a straight line connected between said two image pick-up devices, $$\frac{\left\{R_x(-\theta_L)R_y(-\phi_L)R_z(-\alpha_L)\begin{pmatrix}X_L'\\Y_L'\\1\end{pmatrix}\right\}_y}{\left\{R_x(-\theta_L)R_y(-\phi_L)R_z(-\alpha_L)\begin{pmatrix}X_L'\\Y_L'\\1\end{pmatrix}\right\}_z} =$$

$$\frac{\left\{R_x(-\theta_R)R_y(-\phi_R)R_z(-\alpha_R)\begin{pmatrix}X_R'\\Y_R'\\1\end{pmatrix}\right\}_y}{\left\{R_x(-\theta_R)R_y(-\phi_R)R_z(-\alpha_R)\begin{pmatrix}X_R'\\Y_R'\\1\end{pmatrix}\right\}_z}$$

where,

"$\{\text{expression}\}_y$" represents a y component of the expression, and

"$\{\text{expression}\}_z$" represents a z component of the expression, respectively.

2. A method for detecting the magnifications and angular deviations from a reference position of a plurality of image pick-up devices located at different positions, which devices pick-up images of the same object in a three-dimensional space, comprising:

locating image points in two of said image pick-up devices which correspond to the same point on said object, the point locations being expressed as coordinates in a predefined coordinate system having x, y, and z axes, where (x,y,z) are the coordinates of the point on the object and $(X_L', Y_L')$ and $(X_R', Y_R')$ are the coordinates of said two image points; and determining the magnifications, $f_L$ and $f_R$, and angular deviations, $(\theta_L, \phi_L, \alpha_L)$ and $(\theta_R, \phi_R, \alpha_R)$, of the two pick-up devices with respect to the x, y, and z axes from the reference position, said two image pick-up devices being positioned so that the optical axes thereof are parallel, utilizing the following equation based on that, in said reference state, the coordinate values of corresponding points on the images obtained from said two image pick-up devices match on the axis perpendicular to a straight line connected between said two image pick-up devices,:

$$\frac{1}{f_L}\frac{\left\{R_x(-\theta_L)R_y(-\phi_L)R_z(-\alpha_L)\begin{pmatrix}X_L'\\Y_L'\\1\end{pmatrix}\right\}_y}{\left\{R_x(-\theta_L)R_y(-\phi_L)R_z(-\alpha_L)\begin{pmatrix}X_L'\\Y_L'\\1\end{pmatrix}\right\}_z} =$$

$$\frac{1}{f_R}\frac{\left\{R_x(-\theta_R)R_y(-\phi_R)R_z(-\alpha_R)\begin{pmatrix}X_R'\\Y_R'\\1\end{pmatrix}\right\}_y}{\left\{R_x(-\theta_R)R_y(-\phi_R)R_z(-\alpha_R)\begin{pmatrix}X_R'\\Y_R'\\1\end{pmatrix}\right\}_z}$$

where,

"{expression}$_y$," represents a y component of the expression, and

"{expression}$_z$," represents a z component of the expression, respectively.

3. An apparatus for determining the position or configuration of an object in three-dimensional space, comprising:

a plurality of image pick-up devices located at spaced locations, each producing an image of the object as viewed from the respective location in three-dimensional space, two of said image pick-up devices being positioned so that the optical axes thereof are parallel and have magnification f$_L$ and f$_R$, respectively;

means for locating image points in said two image pick-up devices which correspond to the same point on said object, said locating means producing position signals representing the image point locations as coordinates in a predefined coordinate system having x, y, and z axes, where (x,y,z) are the coordinates of the point on the object and (X$_L$', Y$_L$') and (X$_R$', Y$_R$') are the coordinates of said two image points; and means responsive to said position signals for determining the angular deviations, ($\theta_L$, $\phi_L$, $\alpha_L$) and ($\theta_R$, $\phi_R$, $\alpha_R$), of said two pick-up devices with respect to the x, y, and z axes from the reference position, utilizing the following equation based on that, in said reference state, the coordinate values of corresponding points on the images obtained from said two image pick-up devices match on the axis perpendicular to a straight line connected between said two image pick-up devices, $$\frac{1}{f_L} \frac{\left\{R_x(-\theta_L)R_y(-\phi_L)R_z(-\alpha_L)\begin{pmatrix}X'_L\\Y'_L\\1\end{pmatrix}\right\}_y}{\left\{R_x(-\theta_L)R_y(-\phi_L)R_z(-\alpha_L)\begin{pmatrix}X'_L\\Y'_L\\1\end{pmatrix}\right\}_z} =$$

$$\frac{1}{f_R} \frac{\left\{R_x(-\theta_R)R_y(-\phi_R)R_z(-\alpha_R)\begin{pmatrix}X'_R\\Y'_R\\1\end{pmatrix}\right\}_y}{\left\{R_x(-\theta_R)R_y(-\phi_R)R_z(-\alpha_R)\begin{pmatrix}X'_R\\Y'_R\\1\end{pmatrix}\right\}_z}$$

where,
"{expression}$_y$," represents a y component of the expression, and
"{expression}$_z$," represents a z component of the expression, respectively.

4. The apparatus of 3, wherein said means for determining includes means for deriving the values of magnification f$_L$ and f$_R$ from said equation.

5. An apparatus for determining the position or configuration of an object in three-dimensional space, comprising:

a plurality of image pick-up devices located at spaced locations, each producing an image of the object as viewed from the respective location in three-dimensional space, two of said image pick-up devices being positioned so that the optical axes thereof are parallel and have magnification f$_L$ and f$_R$, respectively;

means for locating image points in said two image pick-up devices which correspond to the same point on said object, said locating means producing position signals representing the image point locations as coordinates in a predefined coordinate system having x, y, and z axes, where (x,y,z) are the coordinates of the point on the object and (X$_L$', Y$_L$') and (X$_R$', Y$_R$') are the coordinates of said two image points; and a matrix operating unit responsive to said position signals for evaluating each term of approximate expression of e'="Left term−Right term":

$$e'=-(Y_L-Y_R+1)\theta_L+X_LY_R\phi_L+X_L\alpha_L-X_RY_L\phi_R-X_R\alpha_R+(Y_L-Y_R)+Y_Ld$$

where, $F = f_L/f_R$
$= 1 + d$ of the following equation based on that, in said reference state, the coordinate values of corresponding points on the images obtained from said two image pick-up devices match on the axis perpendicular to a straight line connected between said two image pick-up devices, where,
"{expression}y" represents a y component of the expression, and
"{expression}z" represents a z component of the expression, respectively, matrix accumulating means for accumulating matrices of products of each term of $\theta_L$, $\phi_L$, $\alpha_L$, $\phi_R$, $\alpha_R$, d and each term of $\theta_R$, $\phi_R$, $\alpha_R$, $\phi_L$, $\alpha_L$, d, 1, which are the calculated results of said matrix operating unit;

a rotation/magnification calculating unit for calculating the actual rotation $\theta_L$, $\phi_L$, $\alpha_L$, $\phi_R$, $\alpha_R$, and the ratio d of magnification of the both image pick-up devices from the case where the optical axes of said two image pick-up devices are parallel by solving values of matrices accumulated in said matrix accumulating unit as simultaneous linear equations; and an error evaluating means for evaluating an error of the solution obtained by said rotation/magnification calculating unit, and iterating said operation until the error is reduced to less than a predetermined value.

* * * * *